Oct. 11, 1949.  C. F. KEZER  2,484,573
MOTION AND POSITION CONTROL DEVICE
Filed Oct. 16, 1946
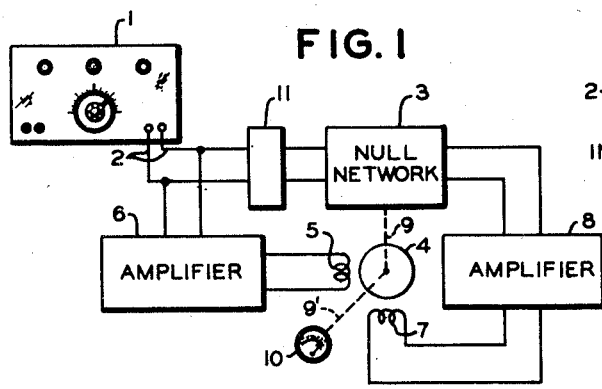
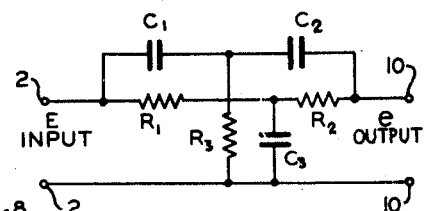
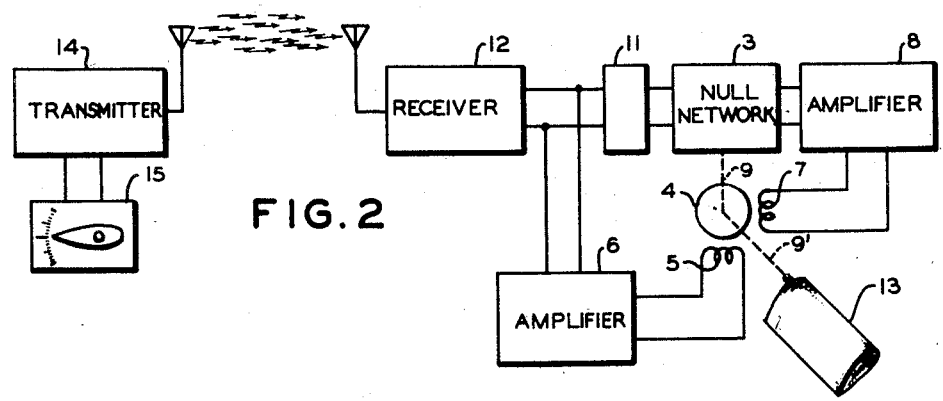
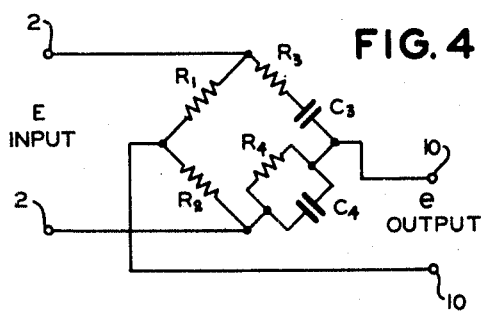
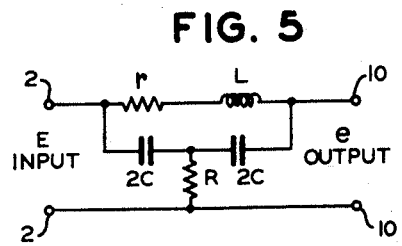
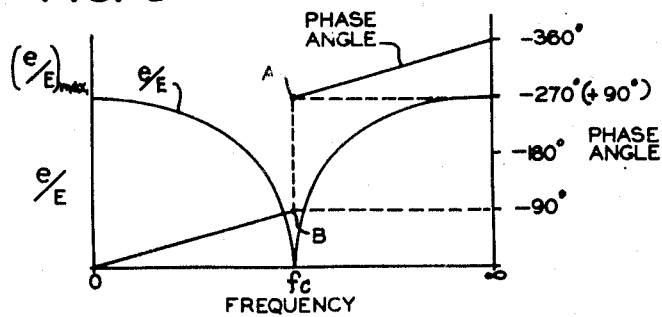
*INVENTOR.*
CHARLES F. KEZER
BY
Donald W. Farrington
ATTORNEY Patented Oct. 11, 1949

2,484,573

UNITED STATES PATENT OFFICE 2,484,573

MOTION AND POSITION CONTROL DEVICE

Charles F. Kezer, Middle River, Md., assignor to The Glenn L. Martin Company, Middle River, Md., a corporation of Maryland Application October 16, 1946, Serial No. 703,524

5 Claims. (Cl. 318—28)

This invention relates to the method and apparatus for effecting the continuous control of the movement of a member in an electrical circuit by causing a frequency change in the source of an alternating voltage. The output of an alternating voltage generator may be fed into a null network or bridge. The bridge circuit contains circuit elements which permit it to be in a balanced condition at only one frequency, that is, for any particular value of circuit elements, the bridge or null network will have no voltage across the null points or output terminals for a particular frequency. A two-phase induction motor has one phase connected to the output of the generator and the other phase connected across the null points of the network or bridge. The motor is mechanically connected to one or more of the circuit elements so that as the motor is energized by the unbalance of the bridge, it will drive a mechanism to adjust the circuit elements. The motor can be so connected that the adjusting of the circuit elements will tend to rebalance the bridge and stop the motor. It can be seen then, if the bridge is balanced for a particular frequency of the generator, the motor will be at rest, but if the frequency of the generator should be changed to a different frequency, the motor will be energized and rotate the mechanism adjusting the circuit elements to a new balanced condition, at which time, the motor will reach a new "at rest" position. It can readily be seen, therefore, that by varying the frequency of the source of alternating voltage applied to the control circuit, the motor, or any member moved by it, may be positioned at any predetermined point.

It is an object of this invention to provide a means to effect continuous control of the movement of a member by causing frequency change in the source of the alternating voltage.

It is another object of this invention to provide a simple network of inherently rugged circuit elements that will maintain their electrical characteristics over a long period of time.

Another object of this invention is the control of the movement of a member by effecting the change in the frequency in the control circuit from a remote point.

It is a further object of this invention to control the positioning or adjusting of the movement of a member within narrow limits by controlling the frequency of the voltage applied to the null network that will be balanced for the particular frequency and utilizing the voltage generated across the null points of the bridge to actuate means to rebalance the bridge for a new frequency, the means so actuated to adjust the bridge elements also being employed to preposition or to control the motion of other elements.

Further and other objects will become apparent from the description of the accompanying drawings, which form a part of this disclosure and in which like numerals refer to like parts.

In the drawings:

Figure 1 is a schematic arrangement of a variable frequency oscillator and frequency responsive network.

Figure 2 shows an application of the circuit illustrated in Figure 1 for the remote control of the motion or the position of a member.

Figures 3, 4 and 5 show three forms of null networks that may be used in the circuits of Figures 1 or 2.

Figure 6 shows the relationship between voltage, phase and frequency in the induction motor circuit.

Figure 1 shows the control circuit for positioning an element. In the circuit diagram, the variable frequency generator 1 feeds its output through lines 2 to a null network 3. Two-phase induction motor 4 has phase 5 connected to the input of the null network. Phase 7 is connected to the null points of the network. Amplifiers 6 and 8 may be needed, depending upon the power considerations and the design of induction motor 4. The amplifiers will be designed to have negligible phase shift for the range of frequencies of operation.

Figures 3, 4 and 5 show types of null networks that may be used in the control circuits of Figures 1 and 2. Each of the three types of networks shown have advantages and disadvantages depending upon the particular installation, and there are many other known networks having similar characteristics that may be used in the control circuits. Each application of the control circuit must be examined to see if one network may be preferable to another for a particular application.

Figure 3 illustrates a network known as the parallel-T. It has the advantage of a common ground terminal for input and output circuits, but it should be noted that three capacitors must be varied to vary the frequency of balance and that one of the capacitors does not have a common terminal with the other two. This makes using the ordinary three-gang radio tuning capacitor impossible without structural modification. A convenient choice of circuit constants is:

$$R_1 = R_2 = 2R_3 = R$$

$$C_1 = C_2 = \frac{C_3}{2} = C$$

The balance frequency for these constants is:

$$f_c = \frac{1}{2\pi RC}$$

Figure 4 shows the more common form of a bridge circuit having resistors $R_1$ and $R_2$ in two of the arms and $R_3$ and $R_4$ in the other arms. Condensers $C_3$ and $C_4$ are in the arms with $R_3$ and $R_4$ respectively. It should be pointed out that this network requires a bridge transformer as it is not possible to ground one side of both input and output, as is usually preferred in electrical circuit practice. It has the advantage, however, that only two capacitors or resistors need be varied to the balance, or null, frequency. A convenient choice of circuit constants is:

$$R_1=2R_2, \quad R_3=R_4, \quad C_3=C_4$$

For these values the frequency balance is:

$$f_c=\frac{1}{2\pi RC}$$

where
$$C=C_3=C_4$$
$$R=R_3=R_4$$

The network shown in Figure 5 is of the bridged-T type and is nearly equivalent to the other networks discussed above when the Q of the coil L is very low. It has the advantage over the other two networks in that if the Q of the coil L is made large compared to unity, a very sharp balance is obtained, that is, frequencies close to the null frequency attenuated much less than in the networks discussed above. Hence, less amplification would be required following the bridged-T type of network. With the circuit constants shown on the drawing the balanced condition is:

$$R=\frac{\omega L Q}{4}$$

$$\left(Q=\frac{\omega L}{r}, \omega=2\pi f_c\right)$$

and $$f_c=\frac{\omega 1}{2\pi\sqrt{LC}}$$

From the equation of $f_c$, it will be seen that while only two capacitors need be varied to vary the null frequency, the null frequency is inversely proportional to the square root of capacitance, rather than to the capacitance itself as in the two previous networks. Hence, the range of null frequencies which may be obtained by varying capacitance is much less for the same size condenser.

For any frequency generated by the variable frequency generator 1 the circuit elements of the null network may be adjusted to the balanced condition. When the network is balanced, there will be no voltage $e$ across the output terminals. Therefore, there will be no energy in phase 7 of the motor that will tend to cause rotation of the motor. Phase 5 is always energized but since the motor is a two-phase induction motor, there must be energy in each phase with a phase difference approaching 90° to cause rotation of the motor. When the frequency applied to the bridge through lines 2 is changed to a new value of frequency, a voltage $e$ will be developed across the output terminals and phase 7 will receive some energy. The motor will rotate to restore the balance of the bridge by adjusting the variable circuit elements to balance at the new frequency. This is effected by the rotation of shaft 9 of the motor.

In Figure 1 shaft 9 of the motor is extended as 9' through the motor to an indicator 10 which indicates the movement of the motor shaft or position of the circuit elements for the new value of frequency. In an actual installation, motor 4 will drive shaft 9 through a gear box because the motor will turn considerable more revolutions when energized than will be necessary in shaft 9 to balance the circuit by, for example, turning a radio tuning capacitor. Since the ordinary tuning capacitor varies only 180° in range, the indicator 10 can turn the same amount and be calibrated to indicate frequency at which the circuit is balanced.

It can be seen from a consideration of Figure 6 that at the bridge balance frequency $f_c$, the ratio of the output and input voltage is zero because of the balanced condition of the bridge. If the frequency applied to the bridge either increases or decreases relative to the balance frequency $f_c$, it is accompanied by a rather large increase in the output to input voltage ratio because of the increased difference in potential $e$ at the null points of the network. It will also be noted that there is a corresponding change in phase as the frequency goes through the balanced bridge condition. This causes the energy of phase 7 to be reversed relative to phase 5 of the induction motor to cause a reversal of rotation of shaft 9 which must be properly mechanically connected to effect a return to the center frequency or balance frequency $f_c$.

In all of the networks above, absolute zero output at the null frequency is not practical to obtain. It has been found, however, that output at the null frequency may be reduced to 60 decibels or more below the input level by careful matching of components so that the balance conditions are fulfilled. It can be seen from a consideration of Figure 6 that even if the "null" output is not zero, the voltage existing at the minimum is not of the proper phase to produce rotation of the induction motor used in this invention. The residual small voltage in the output circuit, as the balanced frequency $f_c$ is approached, will be seen from a consideration of Figure 6 to have a phase following the phase curve between points A and B which is substantially vertical. This means that the phase of a small voltage is almost 180° out of phase with the voltage applied to the other phase of the two-phase motor. It should be clear that rotation of the motor will not, therefore, result from this very small component of voltage substantially 180° out of phase with the second phase of the motor. It may even be desirable to have a slight unbalance of the bridge, as in practice it has been found the "damping" characteristics of the motor may be improved thereby.

Another factor tending to produce an output at the null frequency is the presence of harmonics in the source voltage. These, being of frequency different from the balance frequency of the network, appear at the output of the network. Since these harmonic voltages are not of the proper frequency to produce rotation of the motor used in this invention, their presence in moderate amounts may not be objectionable. However, they may produce a vibration of the motor shaft at the balance position, and it may be desirable to incorporate a conventional low pass filter 11 ahead of the null network to remove the harmonics.

Figure 2 shows the circuit of Figure 1 in which the variable frequency generator 1 is replaced by a radio receiver 12. Receiver 12 will receive and transmit the received energy at a particular frequency to the network and induction motor control. For a particular frequency, the network elements may be adjusted to preposition motor shaft extension 9'. To this is shown attached by way of example, a control airfoil 13. Such an airfoil and control might be employed on a pilotless aircraft such as a guided missile. The transmitter 14 receives the output from a variable frequency oscillator 15. The variable frequency oscillator 15 may be calibrated so that the position of the control airfoil 13 may be accurately determined by setting the variable frequency oscillator 15 on the proper frequency and transmitting energy of this frequency to a remote receiver 12 which through the motor and control network will accurately position the control airfoil 13. In a similar manner, the throttle of such a pilotless aircraft might be controlled as well as any other mechanical or aerodynamic function of such a craft.

It can readily be seen that the network and motor control, responsive to variable frequency, may be employed for the remote prepositioning of an element, that is, variable oscillator 15 and transmitter 14 may be a small package unit. The frequency of oscillator 15 may be made responsive to any of many conditions. The frequency determined by such conditions will determine the balanced condition of the circuit and the position of shaft 9', which can be connected to a mechanism to record or indicate the condition controlling the frequency of oscillator 15. For example, a small oscillator and transmitter might be located at some remote point from a central station. The frequency of the oscillator might be made responsive to the water level in a river or dam and this level could then be continuously recorded in the central station by the null network and induction motor employed with a recorder, responsive to the variable frequency.

It can be seen that this means for effecting continuous control of the movement of a member by an electrical circuit responsive to a frequency, can have wide application in telemetering systems in general, in a similar manner.

It is to be understood that certain changes, alterations, modifications and substitutions can be made without departing from the spirit and scope of the appended claims.

I claim as my invention:

1. A frequency responsive positioning control device for controlling the position of a member including motor means to position said member, a control circuit for said motor including a null network having at least one variable circuit element to balance said network for any frequency, said motor being actuated by the voltage generated in the null points upon any unbalance of said network, said motor also being connected to vary said circuit element of said network to reestablish the balance thereof for any frequency voltage applied to said network, so that for any frequency voltage applied to the network the motor will be energized to move said member and said variable circuit element to tend to balance the network for the new frequency and position said member.

2. A positioning control device including an alternating voltage generating means, means to vary the frequency of said voltage generating means, a motor means to position a member, a control circuit therefor, said control circuit including a null network having at least one circuit element that may be varied to balance said null network for any frequency voltage, said motor being actuated by the voltage generated at the null points of the network upon any unbalance of said network, said motor being also connected to said circuit element of said network to simultaneously position said member and adjust the circuit element tending to rebalance the network for any frequency voltage from said generator applied to said network.

3. A positioning control device for controlling the position of a member including motor means connected to position said member, a control circuit for said motor means including a null network, a source of alternating voltage applied to said network, said network having at least one variable circuit element to balance said network for any frequency voltage applied thereto, said motor being actuated by the voltage generated at the null points of the network for any unbalanced condition thereof, said motor being connected to adjust said circuit element to reestablish the balance of the network for any frequency applied to the network, whereby upon a variation in frequency in the source of the alternating voltage, the motor will be energized to position said member by reestablishing the balance of the null network for the new frequency.

4. A positioning control device for controlling the position of a member including motor means connected to position said member, a control circuit for said motor means including a null network, a source of alternating voltage applied to said network, said network having at least one variable circuit element to balance said network for any frequency voltage applied thereto, said motor being actuated by the voltage generated at the null points of the network for any unbalanced condition thereof, said motor being connected to adjust said circuit elements to reestablish the balance of the network for any frequency applied to the network, said source of alternating voltage comprising a remote variable frequency oscillator and transmitter, and a receiver circuit connected to the input of said network so constructed and arranged that upon a variation in frequency in the source of the alternating voltage the motor will be energized to position said member by reestablishing the balance of the null network for the new frequency.

5. A control circuit including means to generate an alternating voltage, means to adjust voltage to a predetermined frequency, a null network in said circuit connected to the output circuit of the generator, means operated in response to the unbalanced voltage of said null network to tend to restore the balance condition in said network for the predetermined frequency.

CHARLES F. KEZER.

REFERENCES CITED

The following references are of record in the file of this patent:

UNITED STATES PATENTS

| Number | Name | Date |
| --- | --- | --- |
| 2,256,487 | Moseley et al. | Sept. 23, 1941 |
| 2,260,122 | Moore | Oct. 21, 1941 |
| 2,408,819 | Sorensen | Oct. 8, 1946 |